D. H. KLOTZ.
STOVE-PIPE JOINT.
No. 171,389.   Patented Dec. 21, 1875.
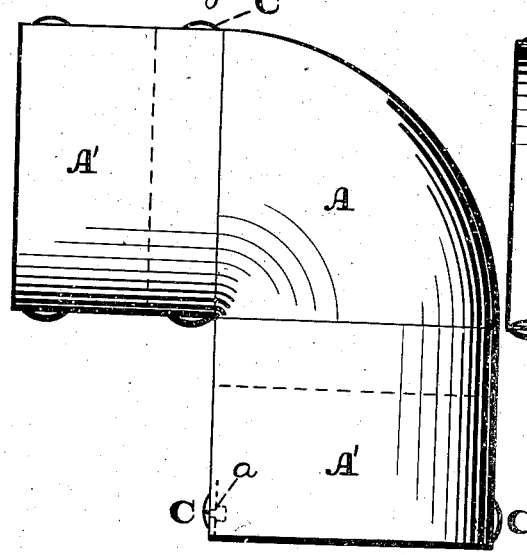
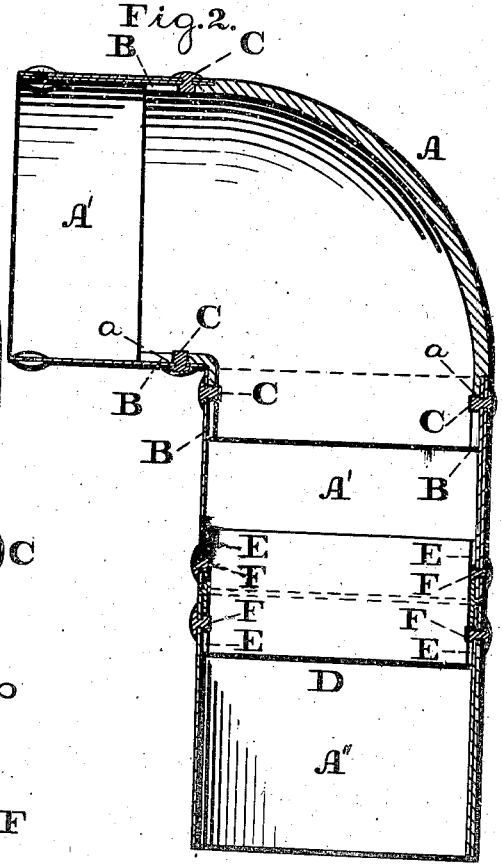
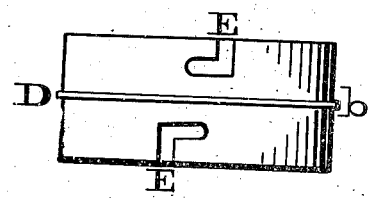
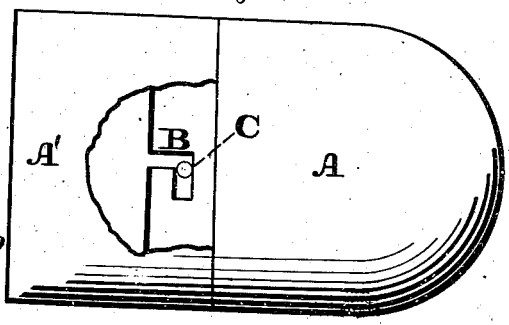
Witnesses:
Lewis F. Brous
A. P. Grant
Inventor:
Daniel H. Klotz
by John A. Wiedersheim
Atty.

UNITED STATES PATENT OFFICE.

DANIEL H. KLOTZ, OF PHILADELPHIA, PENNSYLVANIA, ASSIGNOR OF ONE-HALF HIS RIGHT TO BENJAMIN F. DUBOIS, OF SAME PLACE.

IMPROVEMENT IN STOVE-PIPE JOINTS.

Specification forming part of Letters Patent No. 171,389, dated December 21, 1875; application filed November 3, 1875.

*To all whom it may concern:*

Be it known that I, DANIEL H. KLOTZ, of the city and county of Philadelphia, and State of Pennsylvania, have invented new and useful Improvements in Stove-Pipe Joints; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1 is a side view of a stove-pipe embodying my invention. Fig. 2 is a longitudinal section thereof. Fig. 3 is a top view thereof, partly broken away.

Similar letters of reference indicate corresponding parts in the several figures.

My invention consists of a cast metallic elbow, which is connected to the ends of the pipe by slots and engaging-studs, whereby the elbow and pipes, when in position, cannot be disengaged from each other by strain in the direction of the lengths of the pipe. It also consists in concealing the fastenings for the elbow and pipe. It further consists in constructing the engaging-studs whereby they also serve as rivets for the joints of the pieces of pipe. It also consists of a band fitted between the ends of adjacent lengths of the pipe for connecting said lengths. It also consists of a bead circumferentially on the band, for forming flush and tight joints between the edges of the lengths of pipe.

Referring to the drawings, A represents an elbow, which is made of cast metal, and is preferably of curved form. In the ends of the elbow there are formed L-shaped slots B; and projecting inwardly from the inner faces of the pieces A' A' of the stove-pipe to be connected to the said elbow are pins or studs C, which are adapted to enter the longitudinally-extending limbs or portions of the slots B, and by a partial rotation to engage with the walls of the transverse portions of said slots B.

It will be seen that the pieces or lengths A' A' of the pipe will be firmly connected to the elbow A, and the fastening pins or studs C and slots are concealed by the pieces A' A'.

The pieces A' A' may be readily removed by rotating them until the pins or studs C come in line with the longitudinal portions of the slots B. Then the pieces may be drawn away from the elbow. Moreover, the studs C serve to rivet the longitudinal joints of the pieces A' A' of the pipe. For this purpose the studs are formed with shoulders *a*, against which the inner faces of the pipes come to bearings, and the outer ends of the studs are headed on the outer faces of the pipe, as usually. The portions of the studs adjacent to the shoulders *a* project, in order to connect the pieces A' A' and elbow A, as has been stated.

D represents a band, which is adapted to connect the ends of adjacent lengths A' A'' of the stove-pipe. L-shaped slots E are formed in the band, on opposite sides thereof, and studs F project inwardly from the inner faces of the lengths A' A'', so that said studs F may engage with the slots E, and by a rotation of the lengths A' A' the latter will be nicely connected to the band D, and consequently to each other.

The lengths A' A'' may be easily disconnected by properly rotating the same, and withdrawing them from the band.

A bead, *b*, is formed circumferentially on the band D, and the edges of the lengths A' A'' come in contact therewith, so as to form a flush joint thereat. The studs F also serve to rivet the longitudinal joints of the lengths A' A'', and the entire band D, with the studs F and slots E, are concealed within the pipe, thus in both cases the exterior surfaces of the pipe and elbow presenting the appearances of stove-pipe ordinarily constructed and secured.

The transverse portions or limbs of the L-shaped slots will extend somewhat diagonally, so that when the studs reach the same the pieces of pipe will be drawn up tightly in position.

Having thus described my invention, what I claim as new, and desire to secure by Letters Patent, is—

1. The cast metallic elbow A, connected to the lengths of pipe by locking-joints, consisting of slots and engaging-studs, substantially as and for the purpose set forth.

2. The elbow A and pipe A', in combination with concealed fastenings, consisting of L-shaped slots B in the elbow, and studs C, projecting inwardly from the inner faces of the pipe, substantially as and for the purpose set forth.

3. The studs C, formed with shoulders $a$, and projecting inwardly from the pipe, in combination with elbow A, having attaching-slots B, substantially as and for the purpose set forth.

4. The locking-band D, in combination with the lengths of pipe, substantially as and for the purpose set forth.

5. The bead $d$, in combination with the locking-band D and lengths of pipe, substantially as and for the purpose set forth.

D. H. KLOTZ.

Witnesses:
JOHN A. WIEDERSHEIM,
H. E. HINDMARSH.